(12) United States Patent
Kimura et al.

(10) Patent No.: US 8,067,862 B2
(45) Date of Patent: Nov. 29, 2011

(54) LINEAR MOTOR ACTUATOR

(75) Inventors: Yoshihiro Kimura, Tokyo (JP); Hiroshi Kaneshige, Tokyo (JP)

(73) Assignee: THK Co., Ltd., Tokyo (JP)

( * ) Notice: Subject to any disclaimer, the term of this patent is extended or adjusted under 35 U.S.C. 154(b) by 400 days.

(21) Appl. No.: 12/095,975

(22) PCT Filed: Nov. 20, 2006

(86) PCT No.: PCT/JP2006/323113
§ 371 (c)(1),
(2), (4) Date: May 21, 2009

(87) PCT Pub. No.: WO2007/066500
PCT Pub. Date: Jun. 14, 2007

(65) Prior Publication Data
US 2009/0278412 A1 Nov. 12, 2009

(30) Foreign Application Priority Data
Dec. 6, 2005 (JP) ................................. 2005-352390

(51) Int. Cl.
*H02K 33/18* (2006.01)
(52) U.S. Cl. .................. 310/12.05; 310/12.32
(58) Field of Classification Search ............ 310/28, 310/12.01, 12.05, 12.31, 12.27, 12.32, 15, 310/12.06
See application file for complete search history.

(56) References Cited

U.S. PATENT DOCUMENTS
6,075,297 A * 6/2000 Izawa et al. ............... 310/12.21
6,326,708 B1 * 12/2001 Tsuboi et al. .............. 310/12.06
2006/0232141 A1 10/2006 Teramachi et al.

FOREIGN PATENT DOCUMENTS

| JP | 61-205731 U | 12/1986 |
| JP | 2000-217334 A | 8/2000 |
| JP | 2002-96233 A | 4/2002 |
| JP | 2004-129441 A | 4/2004 |
| JP | 2004-266914 A | 9/2004 |
| JP | 2004-312983 A | 11/2004 |

OTHER PUBLICATIONS

Notification of Transmittal of Translation of the International Preliminary Report on Patentability (Form PCT/IB/338) of International Application No. PCT/JP2006/323113 mailed Jul. 17, 2008 with Form PCT/IPEA/409.
International Search Report of PCT/JP2006/323113, date of mailing Feb. 13, 2007.

* cited by examiner

*Primary Examiner* — Dang D Le
(74) *Attorney, Agent, or Firm* — Westerman, Hattori, Daniels & Adrian, LLP

(57) ABSTRACT

Provided is a linear motor actuator which generates a sufficient thrust force and a retaining force and is remarkably smaller than conventional linear motor actuators. The linear motor actuator includes a base member (1) provided with a bottom plate (10) and a pair of side walls (11) and formed in a channel shape; a track rail (2) laid on the bottom plate along a longitudinal direction of the base member; a slide table (3) moving along the track rail; stator magnets (40) arranged on an inner side surface of each of side walls of the base member; and a pair of coil members (41) mounted to the slide table and opposed to the stator magnets provided to each of the side walls of the base member, thereby constituting a linear motor (4).

8 Claims, 4 Drawing Sheets

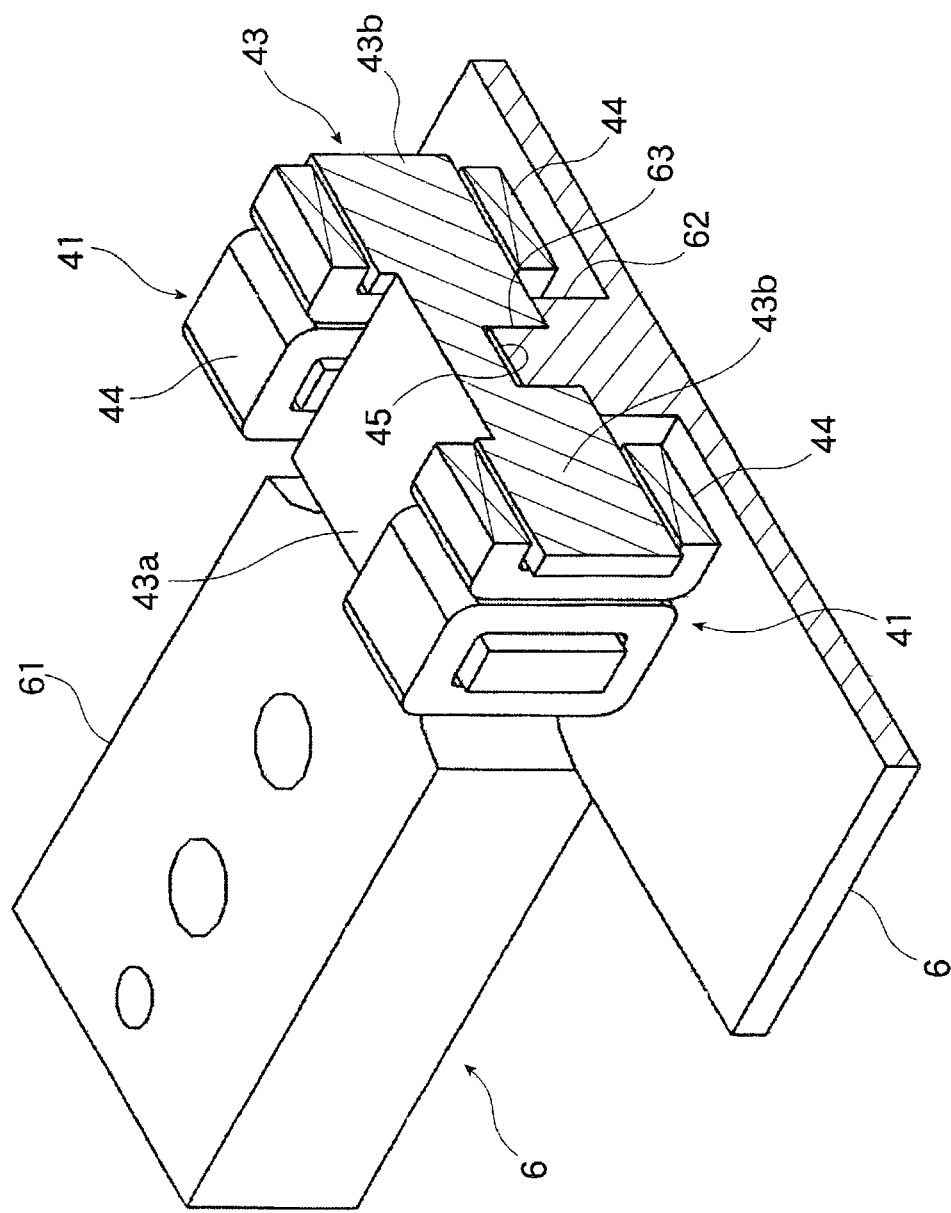

LINEAR MOTOR ACTUATOR

TECHNICAL FIELD

The present invention relates to a linear motor actuator which contains a linear motor, and has a structure in which a slide table freely moves with respect to a base member in response to an input signal, and more particularly, to a linear motor actuator which is downsized to have a width of about 10 mm and a length of about 40 mm to be applicable to various industrial instruments.

BACKGROUND ART

Conventionally, as linear motor actuators, there are known ones disclosed in JP2004-274950 A and JP2004-312983 A. Each of the linear motor actuators disclosed in those publications includes a track rail which has a bottom plate and a pair of side walls and formed into a channel shape therewith, a slide block incorporated between the pair of side walls of the track rail through intermediation of a plurality of balls, and a linear motor for thrusting the slide block along the track rail.

The linear motor includes stator magnets having magnetic poles of N poles and S poles alternately arranged on a straight line, for generating magnetic fields, and a coil member serving as a mover which is electrified by an alternating current to generate a moving magnetic field along an arrangement direction of the magnetic poles of the stator magnets. The stator magnets are provided on the bottom plate along a longitudinal direction of the track rail. The coil member is mounted to the slide block itself or a table fixed to the slide block, and is opposed to the stator magnets through intermediation of a little gap.

There are coil members of types including and not including a core member formed of a ferromagnetic material such as iron. In view of the level of a generated thrust force, the coil member of the former type is advantageous. The core member is provided with teeth, the number of which is a natural-number multiple of the number of phases of the alternating current, and which are opposed to the stator magnets. A coil is wound around each of those teeth. When the coil is energized, each of the teeth becomes an electromagnet. Between each of the teeth and each of the magnetic poles constituting the stator magnets, there is generated a magnetic attractive force or a magnetic repulsive force with respect to each of the magnetic poles. For example, a three-phase alternating current is formed of three alternating currents of u phase, v phase, and w phase differing in phase from each other by 120 degrees. Accordingly, when the alternating currents differing in phase by 120 degrees are successively allowed to pass through the coil wound around the series of teeth such that the tooth at one end of the core member is supplied with the alternating current of the u phase, the teeth next thereto is supplied with the alternating current of the v phase, and the teeth next thereto is supplied with the alternating current of the w phase, there occurs such a phenomenon that the magnetic field looks as if it moves from the tooth positioned at one end of the core member toward the tooth positioned at another end thereof. This is the above-mentioned moving magnetic field. Owing to cooperation between the moving magnetic field and the stator magnets, a thrust force acts between the mover and the stator magnets.

Patent Document 1: JP 2004-274950 A
Patent Document 2: JP 2004-312983 A

DISCLOSURE OF THE INVENTION

Problems to be solved by the Invention

As described above, in view of obtaining a large thrust force, it is desirable that the coil be wound around the core member to constitute the coil member. However, when there exists the core member, even in a case where a current is not supplied to the coil, a magnetic attractive force corresponding to several times the thrust force acts between the stator magnets and the core member, resulting in a state where a load in one direction continuously acts on the slide block to which the coil member is mounted. Accordingly, there is a problem in that the movement of the slide block along the track rail becomes heavier, and bearing balls interposed between the track rail and the slide block is worn earlier.

In particular, in order to downsize the linear motor actuator to such a level that a width thereof is about 10 mm and a length thereof is about 40 mm, it is necessary that an extremely small member be used as a linear guide formed of the track rail and the slide block, and an allowable load of a linear guide is inevitably extremely small. Therefore, when the magnetic attractive force of the linear motor directly acts on the linear guide, the allowable load of the linear motor actuator in the use is reduced by a corresponding amount, so a life of the linear guide becomes shorter.

Means for solving the Problems

The present invention has been made in view of the above-mentioned problems, and it is an object of the present invention to provide a linear motor actuator which generates a sufficient thrust force and a retaining force and is remarkably smaller than conventional linear motor actuators.

According to the present invention, a linear motor actuator achieving the above-mentioned object includes: a base member provided with a bottom plate and a pair of side walls and formed in a channel shape; a track rail laid on the bottom plate along a longitudinal direction of the base member; a slide table moving along the track rail; stator magnets arranged on an inner side surface of each of side walls of the base member; and a pair of coil members mounted to the slide table and opposed to the stator magnets provided to each of the side walls of the base member, thereby constituting a linear motor.

According to the above-mentioned technical means, the stator magnets constituting the linear motor are arranged on the inner side surfaces of the pair of side walls of the base member formed in the channel shape, and a coil member is mounted to a slide block so as to be opposed to the stator magnets provided to the side walls, respectively. Accordingly, attractive forces acting between the stator magnets and the coil members are canceled out. Therefore, it is possible to prevent the magnetic attractive forces generated by the linear motor from continuously acting on the slide block. As a result, an allowable load required for the slide table can be reduced, so while a thrust force of the linear motor is increased, the track rail laid on the base member, and the slide table moving along the track rail can be downsized.

BRIEF DESCRIPTION OF THE DRAWINGS

FIG. 4 is a perspective sectional view showing a state where the table plate and a core plate are coupled to each other.

DESCRIPTION OF REFERENCE NUMERALS

1 . . . base member, 2 . . . track rail, 3 . . . slide table, 4 . . . linear motor, 5 . . . slide block, 6 . . . table plate, 10 . . . bottom plate, 11 . . . side wall, 40 . . . stator magnet, 41 . . . coil member

BEST MODE FOR CARRYING OUT THE INVENTION

Hereinafter, a linear motor actuator of the present invention will be described in detail with reference to the attached drawings.

Figure 1:
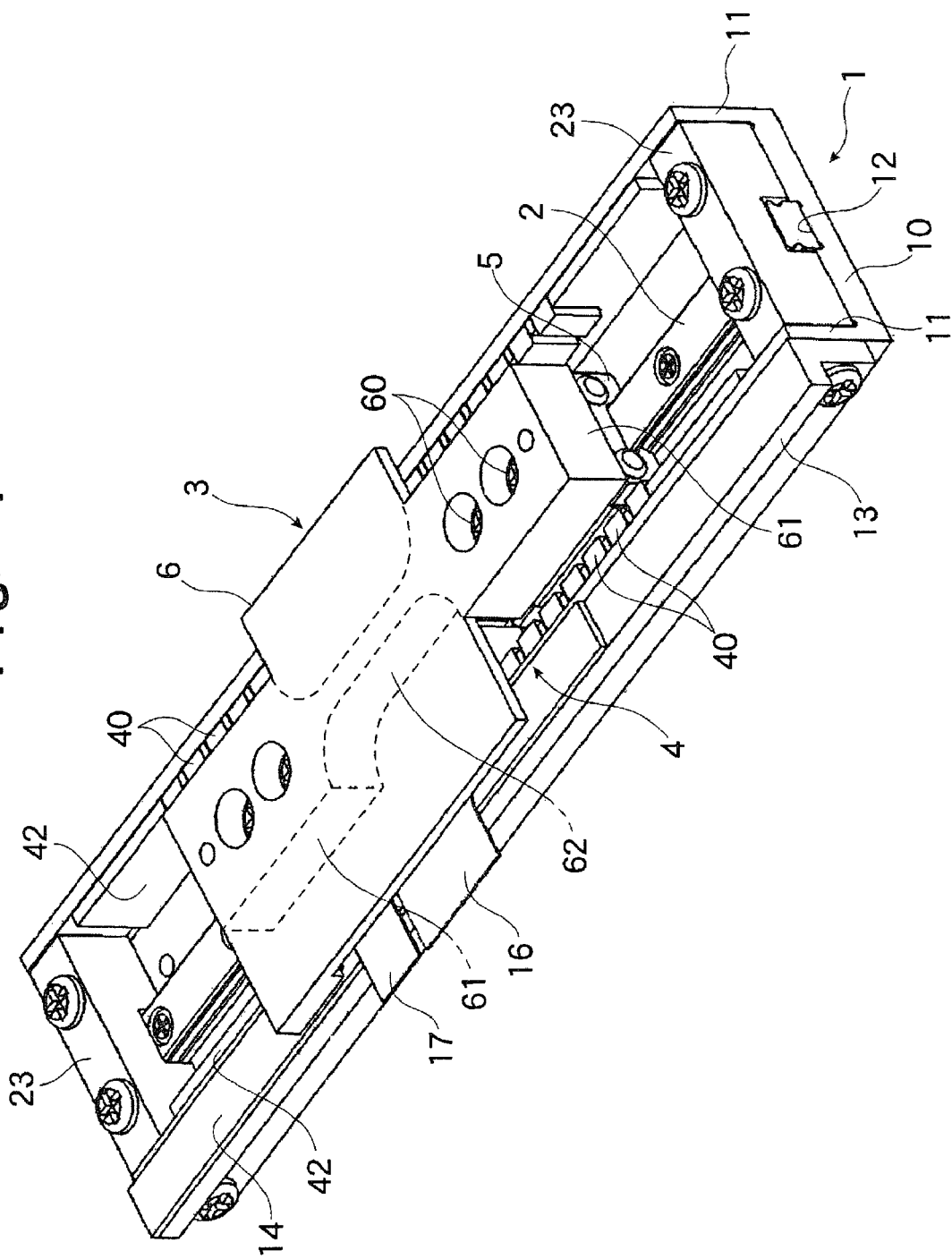
FIG. 1 is a perspective view showing an example of a linear motor actuator to which the present invention is applied.

FIG. 1 is a perspective view showing an example of the linear motor actuator to which the present invention is applied. The linear motor actuator includes a base member 1, a track rail 2 laid on the base member 1, a slide table 3 capable of freely reciprocating along the track rail 2, and a linear motor 4 which thrusts the slide table 3 on the base member 1.

The base member 1 includes a bottom plate 10 and a pair of side walls 11 and 11 provided upright on both sides of the bottom plate 10, is formed in a channel shape, and is made of stainless steel. The bottom plate 10 has a mounting groove 12 formed along a longitudinal direction of the base member 1, for positioning the track rail 2.

Figure 2:
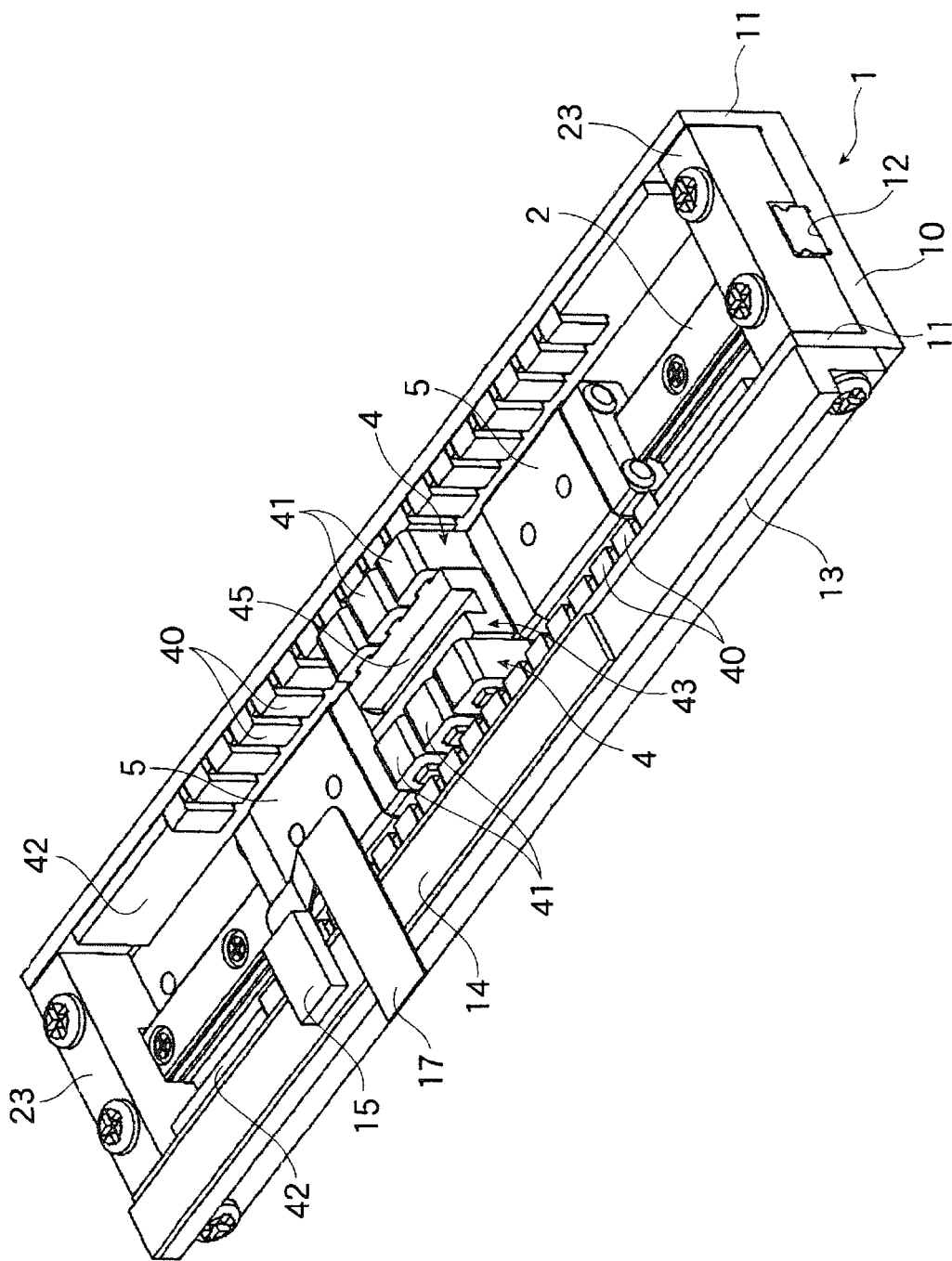
FIG. 2 is a perspective view showing a state where a table plate is omitted from the linear motor actuator shown in FIG. 1.

The slide table 3 includes slide blocks 5 which move along the track rail 2 and a table plate 6 which is fixed to the slide blocks 5. FIG. 2 is a perspective view showing a state where the table plate 6 is removed in the perspective view of FIG. 1. The slide blocks 5 constitute, together with the track rail 2, a linear guide, thereby guiding the table plate 6 along the track rail 2.

Figure 3:
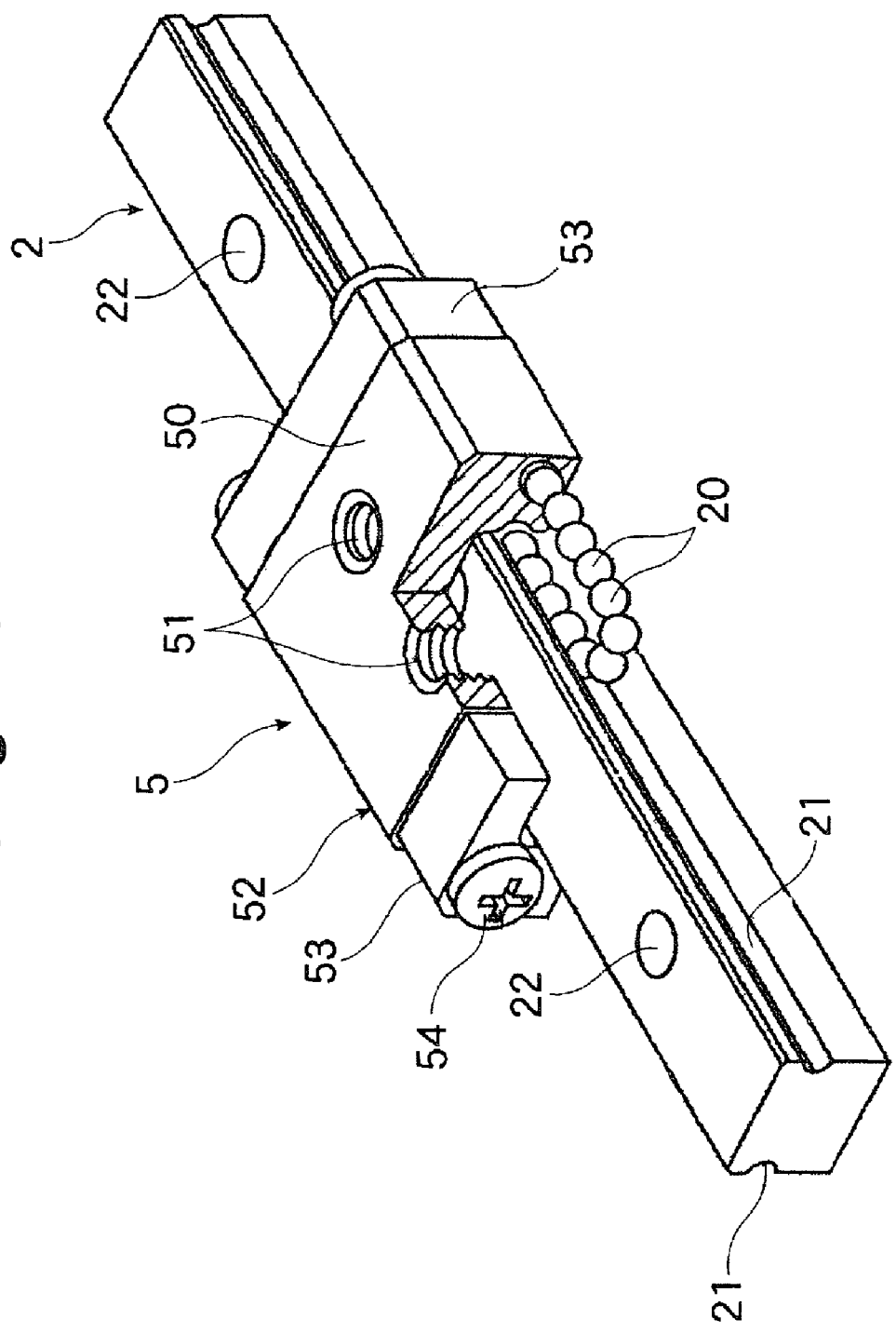
FIG. 3 is a perspective view showing a linear guide which can be used for the linear motor actuator shown in FIG. 1.

FIG. 3 shows an example of the linear guide. The track rail 2 has a substantially rectangular section vertically taken to a longitudinal direction thereof, and a ball rolling groove 21 for rolling balls 20 therein is formed in each of both side surfaces. Further, the track rail 2 has bolt holes 22 formed at appropriate intervals in the longitudinal direction thereof. By fixing bolts inserted into the bolt holes 22, the track rail 2 is fixed to the base member 1.

On the other hand, each of the slide blocks 5 includes a block main body 52 made of stainless steel having a mounting surface 50 to which the table plate 6 is mounted and tap holes 51 into which fixing bolts 60 of the table plate 6 are threaded, and a pair of end caps 53 made of a synthetic resin, which are fixed to both front and back end surfaces of the block main body 52. The end caps 53 are fixed to the block main body 52 by using mounting bolts 54, thereby forming endless circulation paths of the balls 20 in the slide block 5.

The block main body 52 has a substantially saddle-shaped section and is disposed so as to straddle the track rail 2. The balls 20 roll between the ball rolling grooves 21 formed in both side surfaces of the track rail 2 and the block main body 52 while being applied with a load. As a result, the slide blocks 5 to which the table plate 6 is mounted can freely move along the track rail 2 while being applied with the load. Further, the balls 20 circulate in the endless circulation paths, thereby allowing the slide blocks 5 to freely move along the track rail 2 with no limit on stroke thereof.

In the linear motor actuator shown in FIGS. 1 and 2, the two slide blocks 5 are arranged on the single track rail 2 in a fore-and-aft relationship. The table plate 6 is provided so as to extend on both the slide blocks 5. That is, the table plate 6 is fixed to the mounting surface 50 of each of the slide blocks 5. As a result, the two slide blocks 5 are connected to each other, and the slide table 3 including the slide blocks 5 and the table plate 6 which are integrated with each other can freely reciprocate along the track rail 2.

The table plate 6 includes a pair of fixing blocks 61 fixed to the slide blocks 5, respectively, by using the fixing bolts 60, and a bridge portion 62 for connecting the fixing blocks 61 to each other. Each of the fixing blocks 61 is formed in a substantially rectangular shape and is formed to be thicker than the other portion of the table plate 6. Further, the bridge portion 62 is formed to have the same thickness as that of the fixing blocks 61 and is continuous with the pair of fixing blocks 61 and 61 on a lower surface side of the table plate 6.

When the track rail 2 is fixed to the base member 1 and the slide blocks 5 are arranged on the track rail 2, each of the mounting surfaces 50 of the slide blocks 5 exists at a position lower than upper end surfaces of the side walls 11 of the base member 1. However, by fixing the fixing blocks 61 provided to the table plate 6 to the slide blocks 5, the table plate 6 is disposed so as to cover the side walls 11 of the base member 1 from above to downsize the base member 1, and at the same time, an area of the table plate 6 can be set wide. Further, as described above, by providing the table plate 6 at a position above the side walls of the base member 1, later-described coil members 41 of the linear motor 4 can be provided between the pair of slide blocks 5 and 5.

Further, at both ends in a longitudinal direction of the base member 1, stoppers 23 for preventing overrun of the slide blocks 5 along the track rail 2 are fixed, respectively. Each of the stoppers 23 is made of a synthetic resin and is fixed to the bottom plate 10 of the base member 1 so as to straddle the track rail 2.

The linear motor 4 is a linear synchronous motor and includes a plurality of stator magnets 40 arranged in one row on each of the side walls 11 of the base member 1, and a pair of coil members 41 opposed to the stator magnets 40 through an intermediation of a slight gap and mounted to the slide table 3.

On each of the side walls 11 of the base member 1, the stator magnets 40 are arranged such that N poles and S poles are alternately arranged so as to oppose the coil members 41. The stator magnets 40 are arranged on retaining plates 42 made of a synthetic resin. By adhering the retaining plates 42 to inner side surfaces of the side walls 11 of the base member 1, respectively, the stator magnets 40 can be easily arranged on the base member 1. Further, the stator magnets 40 are integrated with the retaining plates 42 by injection-molding the retaining plates 42.

Further, each of the coil members 41 is formed by winding a coil around the core member formed of a ferromagnetic material such as iron. In the linear motor actuator according to the present invention, there are provided the pair of coil members 41 and 41 opposed to the stator magnets 40 arranged on the side walls 11 of the base member 1, respectively. However, in an example shown in FIG. 2, the pair of coil members 41 and 41 are formed by using a single core plate 43.

FIG. 4 is a perspective view showing a state where the coil members 41 and the table plate 6 are coupled to each other. A structure of each of the coil members 41 is illustrated in a sectional view. Note that FIG. 4 illustrates the table plate observed from a back surface side thereof. Each of the coil members 41 is formed by winding a coil 44 around the core plate 43. The core plate 43 includes a central portion 43a coupled to the table plate 6, a pair of core portions 43b and 43b positioned on both sides of the central portion 43a. Each of the core portions 43b is formed with a slot for accommodating the coil 44. That is, by winding the coil 44 around each of the core portions 43b, there are structured the pair of coil members 41 which are integrated to each other by the core plate 43. Each of the coil members 41 includes the coil 44 of three phases including a u phase, a v phase, and a w phase. By supplying an alternating current of the three phases to the coils 44, a thrust force is generated with respect to the coil members 41 along the arrangement direction of the stator magnets 40.

Further, the central portion 43a of the core plate 43 is formed with a fixing groove 45 along a moving direction of the table plate 6. On the other hand, the bridge portion 62 of the table plate 6 has a rib 63 protruding therefrom. The rib 63 to which an adhesive is applied is fitted into the fixing groove 45, thereby coupling the core plate 43 to the table plate 6. That is, the core plate 43 is fixed to the bridge portion 62 of the table plate 6 by being suspended thereon. As a result, the pair of coil members 41 positioned at both side ends of the core plate 43 are respectively opposed to the stator magnets 40 arranged on the inner side surfaces of the side walls 11 of the base member 1. With this structure, the linear motor is constructed.

Further, a bracket 13 having a substantially L-shaped section is fixed to one of the side walls 11 of the base member 1. To an upper surface of the bracket 13, a linear scale 14 is affixed along a longitudinal direction of the base member 1. Further, to a lower surface of the table plate 6, an encoder 15 for reading the linear scale 14 according to a movement of the table plate 6 is fixed. The encoder 15 outputs pulse signals at intervals corresponding to a moving speed of the table plate. There can be utilized the linear scale 14 and the encoder 15 in combination of various types such as a magnetic type or an optical type. However, it is necessary that the linear scale 14 and the encoder 15 be arranged in an extremely narrow space between the upper end surface of the side wall 11 of the base member 1 and the lower surface of the table plate 6. Accordingly, in the illustrated example, the linear scale 14 and the encoder 15 of the magnetic type are used.

For energization of the coil members 41 and transmission of output signals of the encoder 15, a flexible printed cards (FPC) 16 and 17 are used. The FPCs 16 and 17 are fixed to the lower surface of the table plate 6 and are led out in a lateral direction of the base member 1.

In the linear motor actuator structured as described above, when a three-phase alternating current is supplied to the coil members 41 fixed to the table plate 6, a thrust force is generated with respect to the coil members 41 along the arrangement direction of the stator magnets 40, thereby allowing the slide table 3 to move forward and backward along the track rail 2. The encoder 15 reads the scale 14 and outputs an output signal corresponding to a moving speed and a moving distance of the slide table 3. Accordingly, with reference to the output signal of the encoder 15, energization of the coil members 41 is controlled, thereby making it possible to arbitrarily control a reciprocating movement of the slide table 3.

In this case, the coil members 41 are positioned on the both sides of the track rail 2 so as to sandwich the track rail 2. The coil members 41 are opposed to the stator magnets 40 arranged on the inner side surfaces of the side walls 11 of the base member 1, respectively. Accordingly, magnetic attractive forces or magnetic repulsive forces in opposite directions to each other are simultaneously generated on the right and left of the track rail 2. Therefore, a load due to the magnetic attractive force or the magnetic repulsive force does not act on the slide table 3 moving along the track rail 2. Accordingly, the slide table 3 can be lightly moved along the track rail 2 by a corresponding amount.

Further, it is possible to prevent the load due to the magnetic attractive force or the magnetic repulsive force from continuously acting on the slide table 3. Accordingly, with using the linear guide having a small allowable load, the linear motor actuator can be structured. Thus, downsizing of the linear motor actuator can also be achieved.

Note that, in the linear motor actuator according to the present invention actually prototyped by the inventors of the present invention, downsizing can be achieved such that a width of the base member is 10 mm, a height of the table plate 6 is 6 mm, and a width of the track rail is 2 mm, and the slide table 6 can be moved forward and backward with a maximum thrust force of 1.2 N and at a no-load maximum speed of 1866 mm/s.

The invention claimed is:

1. A linear motor actuator, comprising:
a base member provided with a bottom plate and a pair of side walls and formed into a channel shape therewith;
a track rail laid on the bottom plate along a longitudinal direction of the base member;
a slide table moving along the track rail;
stator magnets arranged on an inner side surface of each of side walls of the base member; and
a pair of coil members suspended from the slide table to be positioned on both sides of the track rail so as to sandwich the track rail and opposed to the stator magnets provided to each of the side walls of the base member.

2. The linear motor actuator according to claim 1,
wherein the slide table comprises a pair of slide blocks arranged on the single track rail in a fore-and-aft relationship through intermediation of a plurality of balls and a table plate extending between both the slide blocks, thereby connecting the slide blocks to each other; and
wherein the pair of coil members are positioned between the pair of slide blocks and are fixed to a lower surface of the table plate.

3. The linear motor actuator according to claim 2, wherein the table plate comprises a pair of fixing blocks fixed to the pair of slide blocks, respectively, and a bridge portion which connects the pair of fixing blocks to each other, and to which the pair of coil members are fixed.

4. The linear motor actuator according to claim 3, wherein the pair of coil members comprises a core plate is fixed to a lower surface of the bridge portion of the table plate and coils are accommodated in slots formed at both ends of the core plate.

5. The linear motor actuator according to claim 4,
wherein the lower surface of the bridge portion is formed with a rib continuous with the pair of fixing blocks; and
wherein the core plate is formed with a fixing groove to which the rib is fitted.

6. The linear motor actuator according to claim 2, wherein the base member has stoppers for the slide block which are provided to both ends in the longitudinal direction of the base member.

7. The linear motor actuator according to claim 1, wherein the stator magnets are arranged on resin plates at predetermined intervals, the resin plates being fixed to the side walls of the base member.

8. The linear motor actuator according to claim 1,
wherein the base member has a linear scale mounted to the side wall thereof; and
wherein the slide table has an encoder for reading the linear scale.

* * * * *